US012578230B2

(12) United States Patent
Winzell et al.

(10) Patent No.: US 12,578,230 B2
(45) Date of Patent: Mar. 17, 2026

(54) METHOD AND DEVICE FOR MONITORING OF A HEAP OF MATERIAL

(71) Applicant: Axis AB, Lund (SE)

(72) Inventors: Thomas Winzell, Lund (SE); Ann-Sofie Rase, Lund (SE); Jesper Bengtsson, Lund (SE); Tuong Lam, Lund (SE)

(73) Assignee: Axis AB, Lund (SE)

( * ) Notice: Subject to any disclaimer, the term of this patent is extended or adjusted under 35 U.S.C. 154(b) by 426 days.

(21) Appl. No.: 18/318,024

(22) Filed: May 16, 2023

(65) Prior Publication Data

US 2023/0417599 A1     Dec. 28, 2023

(30) Foreign Application Priority Data

Jun. 22, 2022    (EP) ..................................... 22180300

(51) Int. Cl.
    *G06T 7/13*            (2017.01)
    *G01J 5/02*            (2022.01)
                      (Continued)

(52) U.S. Cl.
    CPC ............. *G01J 5/027* (2013.01); *G01J 5/0803* (2013.01); *G01J 5/0859* (2013.01); *G01K 13/10* (2013.01);
                      (Continued)

(58) Field of Classification Search
    CPC ........ G01J 5/027; G01J 5/0803; G01J 5/0859; G06T 7/13; G06T 7/90; G08B 17/12; G08B 17/125; F23N 2229/20; G01K 13/10
    See application file for complete search history.

(56) References Cited

U.S. PATENT DOCUMENTS 9,250,135 B2 *   2/2016   Cole ....................... G01J 5/046
2003/0214583 A1 *  11/2003  Sadok .................. G08B 17/125
                                                      348/143
                      (Continued)

FOREIGN PATENT DOCUMENTS

CN          106303412 A       1/2017
CN          207439402 U       6/2018
                      (Continued)

OTHER PUBLICATIONS

Computer translation of CN 110675588 A (Year: 2025).*

(Continued)

*Primary Examiner* — Randy W Gibson
(74) *Attorney, Agent, or Firm* — Volpe Koenig

(57)         ABSTRACT

A device for monitoring a heap of material, comprises circuitry for executing a plurality of functions. A region of interest function, in a thermal video stream captured by a thermal video camera, defines a region of interest covering the heap of material. A reference spatial property setting function, from pixels within a video frame of the thermal video stream, determines a spatial property of the heap of material; and sets the determined spatial property as a reference spatial property. A region of interest adjusting function determines a respective sample spatial property for regions in the thermal video stream; and adjusts the region of interest such that regions exhibiting a sample spatial property above a threshold are included by the region of interest. A temperature monitoring function over time and within the region of interest, monitors a temperature measure; and if it exceeds a predetermined threshold, generates an alarm event.

15 Claims, 3 Drawing Sheets

(51) Int. Cl.

| | |
|---|---|
| *G01J 5/08* | (2022.01) |
| *G01J 5/0803* | (2022.01) |
| *G01K 13/10* | (2006.01) |
| *G06T 7/90* | (2017.01) |
| *G08B 17/12* | (2006.01) |

(52) U.S. Cl.

CPC .................. *G06T 7/13* (2017.01); *G06T 7/90* (2017.01); *F23N 2229/20* (2020.01); *G06T 2207/20104* (2013.01); *G06T 2207/30192* (2013.01); *G08B 17/125* (2013.01)

(56) References Cited

U.S. PATENT DOCUMENTS

| | | | | |
|---|---|---|---|---|
| 2004/0061777 A1* | 4/2004 | Sadok | .................. | G08B 17/125 |
| | | | | 348/83 |
| 2007/0281260 A1* | 12/2007 | Mclellan | ................. | F23N 5/082 |
| | | | | 431/79 |
| 2012/0235042 A1* | 9/2012 | Cole | ..................... | G01J 5/0014 |
| | | | | 250/353 |
| 2017/0094228 A1 | 3/2017 | Israelson | | |

FOREIGN PATENT DOCUMENTS

| | | | | | |
|---|---|---|---|---|---|
| CN | 108288059 | A | | 7/2018 | |
| CN | 108986379 | A | * | 12/2018 | ........... G08B 17/005 |
| CN | 110675588 | A | * | 1/2020 | ........... G08B 17/005 |
| CN | 212300446 | U | | 1/2021 | |
| CN | 113920440 | A | | 1/2022 | |
| DE | 102005039424 | A1 | | 2/2007 | |
| DE | 102006039832 | A1 | | 3/2008 | |
| JP | 2006-044804 | A | | 2/2006 | |

OTHER PUBLICATIONS

Computer translation of CN 108986379 A (Year: 2025).*

Chen et al., "Identification and Evaluation of Urban Construction Waste with VHR Remote Sensing Using Multi-Feature Analysis and a Hierarchical Segmentation Method," Remote Sensing, 13(1):158 (2021).

Extended European Search Report dated Nov. 18, 2022 for European Patent Application No. 22180300.0.

* cited by examiner

METHOD AND DEVICE FOR MONITORING OF A HEAP OF MATERIAL

FIELD OF INVENTION

The present disclosure relates to monitoring of a heap of material with a thermal video camera and a device configured to perform such monitoring.

TECHNICAL BACKGROUND

Thermal cameras are excellent devices for monitoring different scenes, especially scenes in which a temperature of one or more objects in the scene is to be monitored. One such example is to monitor heaps of material in a recycling station. By monitoring a temperature of a heap of material, an alarm on increased temperature may be triggered. However, there is a problem of false alarms, typically due to machines having a combustion engine moving around at the recycling station. Hence, there is a need in reducing the number of false alarms.

SUMMARY

It is an object to mitigate, alleviate or eliminate one or more of the above-identified deficiencies in the art and disadvantages singly or in any combination and solve at least the above-mentioned problem.

According to a first aspect method for monitoring a heap of material is provided. The method comprising: defining, in a thermal video stream of a scene captured by a thermal camera, a region of interest covering the heap of material; determining, from a video frame of the thermal video stream, a reference spatial property of the heap of material from pixel data within the region of interest; adjusting the region of interest such that regions in the video stream exhibiting a sample spatial property above a spatial property threshold are included by the region of interest; monitoring, over time and within the region of interest, a temperature measure in the video stream; upon the temperature measure exceeds a predetermined threshold generating an alarm event.

The present method for monitoring a heap of material allow for dynamically adjusting the region of interest so that the heap of material is covered although the heap changed in size, is moved, etc. with time. This allow for avoidance of false alarms, this since only the heap may be covered by the region of interest despite the heap changes in size or is moved with time. The above is realized by adjusting the region of interest such that regions in the video stream exhibiting a sample spatial property above the spatial property threshold are included by the region of interest. The spatial property threshold should be sufficiently high so that non-heap areas are excluded from the heap. The spatial property threshold may e.g., be 60% of the reference spatial property. The reference spatial property of the heap is to be seen as an optical signature for the heap. The spatial property may, e.g., be a measure of a spatial frequency in wavelengths of the thermal image data constituting the video stream. The spatial frequency may be an entropy, an edge density, or another spatial frequency related metrics. The spatial frequency (especially in thermal wavelengths) is typically exhibiting a large distribution for a heap of material whilst a region covering a building, or the ground is typically exhibiting a homogenous spatial frequency. Hence, by adjusting the region of interest based on the spatial property of regions in the scene depicted by the thermal video stream the present method allows for keeping track of moved or changed heaps of material without the need of operator's updating region of interest over time.

The method may further comprise adjusting the region of interest such that regions in the video stream exhibiting a sample spatial property below the spatial property threshold are excluded by the adjusted region of interest.

The temperature measure may be one or more of: an absolute value of temperature and a rate of change for the absolute value of the temperature.

The method may further comprise updating the reference spatial property. The updating of the reference spatial property may be triggered by one or more of: an ambient temperature of the thermal camera, a contrast of the video stream; weather data associated with the scene; season; time of day. By updating the reference spatial property changes over time in the heap of material may be accounted for. For example, size of material in the heap may vary over time by addition or removal of material to/from the heap.

The reference spatial property and the sample spatial property may be calculated for groups of pixels comprising 4×4 to 8×8 pixels. This will reduce the amount of processing power needed in the processing considerably.

The method may further comprise: defining, in the video stream, a plurality of region of interests, wherein each region of interest is covering a specific heap of material; determining, from a video frame of the video stream, a specific reference spatial property for each specific heap of material from pixel data within each respective specific region of interest covering the specific heap of material; adjusting each specific region of interest such that regions in the video stream exhibiting a sample spatial property within 90%-110% of the respective specific reference spatial property are included by the specific region of interest; setting a specific predetermined threshold for the temperature measure for each specific region of interest; monitoring, over time and within each specific region of interest, a specific temperature measure in the video stream; and upon the specific temperature measure exceeds the specific predetermined threshold generating an alarm event. Hence, the spatial frequency distribution in the thermal wavelength range for a heap comprising a specific material can hence be used as an optical signature for each specific heap of material. By this the method allow for setting different types of temperature triggers for different regions of interest, i.e., different heaps of material.

According to a second aspect, a non-transitory computer-readable storage medium is provided. The non-transitory computer-readable storage medium having stored thereon instructions for implementing the method according to the first aspect when executed on a device having processing capabilities.

According to a second aspect, a device for monitoring a heap of material is provided. The device comprising circuitry configured to execute a region of interest function, a reference spatial property setting function, a region of interest adjusting function, and a temperature monitoring function. The region of interest function is configured to, in a thermal video stream of a scene captured by a thermal video camera, define a region of interest covering the heap of material. The reference spatial property setting function is configured to: from pixels within the region of interest of a video frame of the thermal video stream, determine a spatial property of the heap of material; and set the determined spatial property as a reference spatial property. The region of interest adjusting function is configured to: determine a respective sample spatial property for regions in the thermal video stream; and adjust the region of interest such that regions in the thermal video stream exhibiting a sample spatial property above a spatial property threshold are included by the region of interest. The temperature monitoring function is configured to: over time and within the region of interest, monitor a temperature measure in the video stream; and upon the temperature measure exceeds a predetermined threshold generate an alarm event. As discussed above, the spatial property threshold may e.g., be 60% of the reference spatial property.

The region of interest adjusting function may further be configured to adjust the region of interest such that regions in the video stream exhibiting a sample spatial property below the spatial property threshold are excluded by the adjusted region of interest.

The temperature measure may be one or more of: an absolute value of temperature and a rate of change for the absolute value of the temperature.

The reference spatial property setting function may further be configured to, triggered by one or more of: an ambient temperature of the thermal camera, a contrast of the video stream; weather data associated with the scene; season; time of day, update the reference spatial property by, from pixels within a current region of interest of a video frame of the video stream, determine a spatial property of the heap of material, and set the determined spatial property as an updated reference spatial property.

The reference spatial property setting function and the region of interest adjusting function may be configured to determine the reference spatial property and the sample spatial property, respectively, as one or more of: an image entropy and a density of edges.

The reference spatial property setting function and the region of interest adjusting function may be configured to calculate the reference spatial property and the sample spatial property, respectively, for groups of pixels comprising 4×4 to 8×8 pixels.

The region of interest function may be configured to, in the video stream, define a plurality of region of interests, wherein each region of interest is covering a specific heap of material. The reference spatial property setting function may be configured to, from pixels within each respective specific region of interest of a video frame of the thermal video stream, determine a specific reference spatial property for each specific heap of material. The region of interest adjusting function may be configured to adjust each specific region of interest such that regions in the video stream exhibiting a sample spatial property within 90%-110% of the respective specific reference spatial property are included by the specific region of interest. The region of interest function may further be configured to set a specific predetermined threshold for the temperature measure for each region of interest. The temperature monitoring function may be configured to: over time and within each specific region of interest, monitor a specific temperature measure in the video stream, and upon the specific temperature measure exceeds the specific predetermined threshold for the specific region of interest, generate an alarm event.

The device may further comprise an image sensor configured to capture thermal video data of the thermal video stream of the scene.

The above-mentioned features of the method, when applicable, apply to the second and third aspects as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the system described or acts of the methods described as such system and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings does not exclude other elements or steps.

BRIEF DESCRIPTION OF THE DRAWINGS

The above and other aspects of the present disclosure will now be described in more detail, with reference to appended figures. The figures should not be considered limiting; instead, they are used for explaining and understanding.

As illustrated in the figures, the sizes of layers and regions may be exaggerated for illustrative purposes and, thus, are provided to illustrate the general structures. Like reference numerals refer to like elements throughout.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
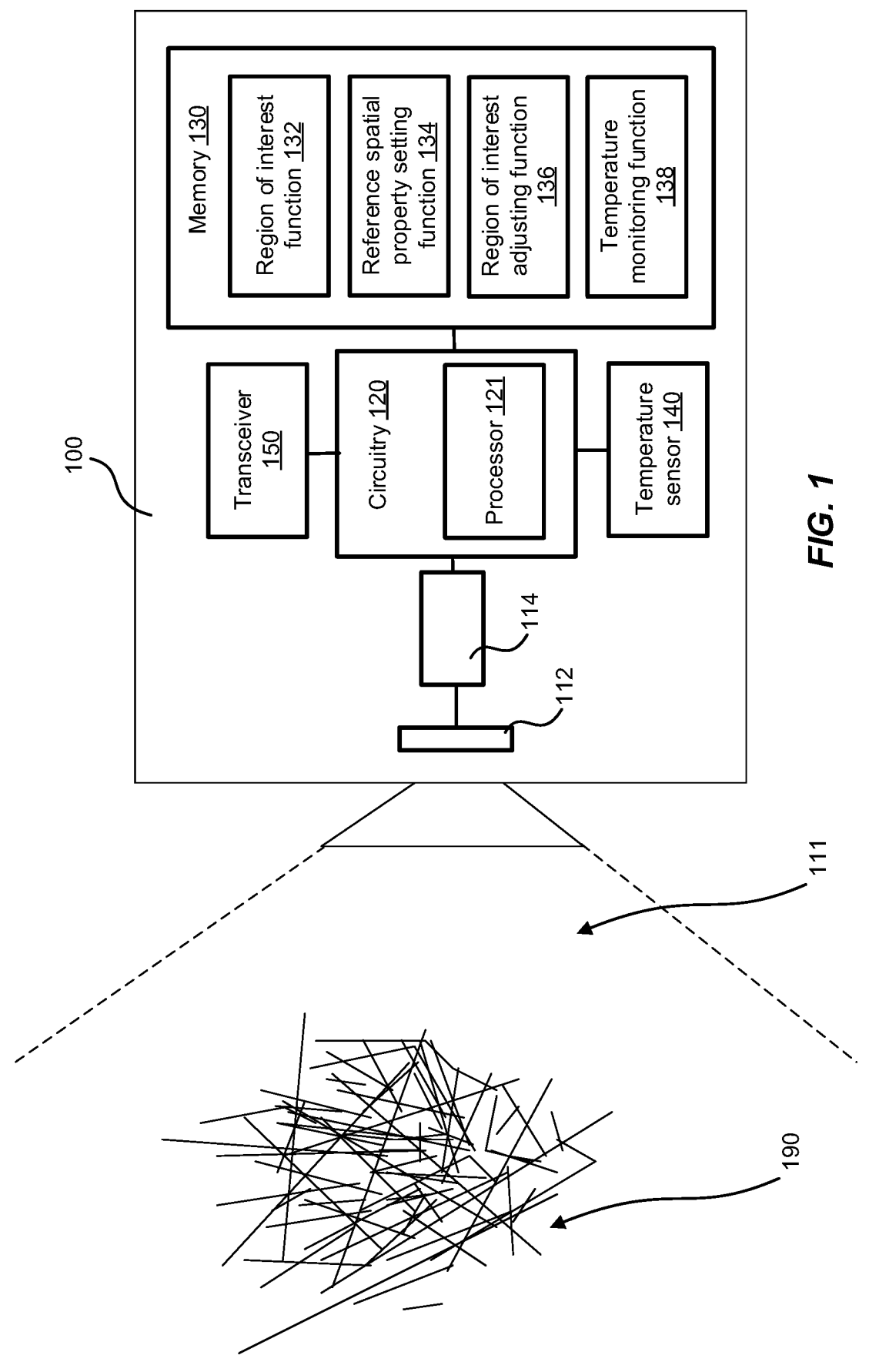
FIG. 1 illustrates a device for monitoring a heap of material.

FIG. 1 illustrates a device 100 for monitoring a heap of material. The device 10 is typically implemented in a thermal video camera. However, the device may be configured to be feed with a thermal video stream from a thermal video camera. In the following the device 100 will be discussed as being implemented in a thermal video camera. The device 100 in the form of the thermal video camera comprises a thermal image sensor 112. The thermal image sensor 112 is configured to capture thermal video data. The thermal video data is typically pixel-based data. The device 100 further comprises a video image pipeline 114. The video image pipeline 114 is configured to process the thermal video data into video frames of a thermal video stream. The thermal video camera is covering a field-of-view 111 depicting a scene. Under implementation the thermal video camera is set to depict a scene comprising one or more heaps 190 of material. The material in each of the one or more heaps 190 of material may be different kind, such as wood scrap, scrap metal, plastic scrap, paper scrap, electronic scrap, etc. Typically, the thermal video camera is set up to monitor a scene covering at least a section of a recovery center. The thermal video camera is further typically set to monitor a temperature of a heap of material 190 and to generate an alarm upon an increased temperature, typically being above a threshold, is monitored. The threshold may be a measure of an absolute temperature in the heap 190. Alternatively, or in combination, the threshold may be a rate of change of a temperature in the heap 190. The threshold may be differently set for heaps of different material. That is a heap mainly consisting of wood may have a lower threshold (in absolute temperature) than a heap mainly consisting of glass.

The device 100 further comprises circuitry 120. The circuitry 120 is configured to carry out overall control of functions and operations of the device 100. The circuitry 120 may include a processor 121, such as a central processing unit (CPU), microcontroller, or microprocessor. The processor 121 is configured to execute program code stored in a memory 130, in order to carry out functions and operations of the device 100.

The memory 130 may be one or more of a buffer, a flash memory, a hard drive, a removable medium, a volatile memory, a non-volatile memory, a random access memory (RAM), or another suitable device. In a typical arrangement, the memory 130 may include a non-volatile memory for long term data storage and a volatile memory that functions as system memory for the circuitry 120. The memory 130 may exchange data with the circuitry 120 over a data bus. Accompanying control lines and an address bus between the memory 130 and the circuitry 120 also may be present.

Functions and operations of the device 100 may be embodied in the form of executable logic routines (e.g., lines of code, software programs, etc.) that are stored on a non-transitory computer readable medium (e.g., the memory 130) of the device 100 and are executed by the circuitry 120 (e.g., using the processor 121). Furthermore, the functions and operations of the device 100 may be a stand-alone software application or form a part of a software application that carries out additional tasks related to the device 100. The described functions and operations may be considered a method that the corresponding part of the device is configured to carry out. Also, while the described functions and operations may be implemented in software, such functionality may as well be carried out via dedicated hardware or firmware, or some combination of hardware, firmware and/or software.

The circuitry 120 is configured to execute a region of interest function 132. The region of interest function 132 is configured to, in a thermal video stream of a scene captured by the thermal video camera, define a region of interest covering the heap 190 of material. The region of interest function 132 may be configured to receive user input for defining region of interest. For example, a user may, on a display showing the scene covered by the thermal video camera, mark an area that shall constitute the region of interest. Alternatively, or in combination, a machine learned model may be used for defining the region or interest. The region of interest defined by region of interest function 132 does not necessarily need to cover the whole heap 190 of material. It is enough that a portion of the heap 190 is covered by the region of interest. Preferably, the region of interest covers at least an area of 10×10 pixels in thermal video data of a frame of the thermal video stream. In combination with the defining of the region of interest for the heap, the region of interest function 132 may further be configured to attribute a temperature threshold for the heap 190. The temperature threshold being a threshold upon if it is reached the device 100 is configured to issue an alarm, see the temperature monitoring function 138 discussed below.

The circuitry 120 is further configured to execute a reference spatial property setting function 134. The reference spatial property setting function 134 is configured to, from pixels within the region of interest of one or more video frames of the thermal video stream, determine a spatial property of the heap of material. The pixels within the region of interest used for determining the spatial property of the heap is preferably pixels well within the heap. The reference spatial property setting function 134 is further configured to set the determined spatial property as a reference spatial property. The reference spatial property of the heap is to be seen as an optical signature for the heap 190. The spatial property may, e.g., be a measure of a spatial frequency in thermal wavelengths of the thermal image data constituting the thermal video stream. The spatial frequency may be an entropy, an edge density, or another spatial frequency related metrics. According to non-limiting examples, the spatial frequency may be determined by applying a Laplacian filter and/or a Sobel filter to pixel data of the thermal image data. The pixel data onto which the Laplacian filter and/or Sobel filter is applied may be grouped into groups of neighboring pixels. Such groups of neighboring pixels may comprise 4×4 to 8×8 pixels. The spatial frequency (especially in thermal wavelengths) is typically exhibiting a large distribution for a heap of material whilst a region covering a building, or the ground is typically exhibiting a homogenous spatial frequency. The spatial frequency distribution in the thermal wavelength range for a heap comprising a specific material can be used as an optical signature for the heap of material.

The circuitry 120 is further configured to execute a region of interest adjusting function 136. The region of interest adjusting function 136 is configured to determine a respective sample spatial property for regions in the thermal video stream. The region of interest adjusting function 136 is typically set to operate on pixel data of thermal image data of image frame(s) being subsequent to the image frame used for setting the reference spatial property. The region of interest adjusting function 136 may be executed periodically. The frequency of the periodically executed region of interest adjusting function 136 may be fixed. For example, the region of interest adjusting function 136 may be executed periodically within a period in the order of a minute to an hour. The frequency of the periodically executed region of interest adjusting function 136 may be random. Alternatively, the region of interest adjusting function 136 may be executed as response to movement detected in the region of interest. Movement in the region of interest is a strong indicator of that the heap is being handled, i.e., either material is added or removed, both providing a reason for adjustment of the region of interest. Movement can be readily detected using analytics of the thermal camera. The respective sample spatial property for regions in the thermal video stream are preferably determined in a same way as the reference spatial property. Hence, the sample spatial frequency may be determined by applying a Laplacian filter and/or a Sobel filter to pixel data of thermal image data. The pixel data onto which the Laplacian filter and/or Sobel filter is applied may be grouped into groups of neighboring pixels. Such groups of neighboring pixels may comprise 4×4 to 8×8 pixels. The region of interest adjusting function 136 may be configured to set a lower threshold for an area to constitute a heap of material to be an area covering at least 3×3 coherent groups of neighboring pixels. The region of interest adjusting function 136 is configured to adjust the region of interest such that regions in the thermal video stream exhibiting a sample spatial property above a spatial property threshold are included by the region of interest. Differently expressed, the region of interest adjusting function 136 is configured to adjust the region of interest such that regions in the thermal video stream exhibiting a sample spatial property below the spatial property threshold are excluded by the adjusted region of interest. Hence, by adjusting the region of interest based on the spatial property of regions in the scene depicted by the thermal video stream the present set-up allows for keeping track of moved or changed heaps of material without the need of operator's updating the region of interest over time. The spatial property threshold may be set to be 60% of the reference spatial property.

The circuitry 120 is further configured to execute a temperature monitoring function 138. The temperature monitoring function 138 is configured to, over time and within the region of interest, monitor a temperature measure in the thermal video stream. The temperature measure may be one or more of: an absolute value of temperature and a rate of change for the absolute value of the temperature. The temperature monitoring function 138 is further configured to, upon the temperature measure exceeds a predetermined threshold, generate an alarm event.

The reference spatial property setting function 134 may further be configured to update the reference spatial property by, from pixels within a current region of interest of a video frame of the video stream, determine a spatial property of the heap of material, and set the determined spatial property as an updated reference spatial property. The update of the reference spatial property may be set to be performed periodically, e.g., once a day or once a week. Alternatively, the update of the reference spatial property may be triggered by one or more of: an ambient temperature of the thermal video camera, a contrast of the thermal video stream, weather data associated with the scene, season, and time of day. The device 100 may comprise a temperature sensor 140 for determining the ambient temperature of the thermal video camera. The device 100 may be connected to a weather service providing weather data associated with the scene. The device 100 may comprise a transceiver 150 through which the device is configured to communication with other devices or services, e.g., the weather service.

Hence, if a change of surrounding environment is the present reference spatial property most probably will be needed to be updated. For example, in case the ambient temperature is changing the reference spatial property is to be updated. The ambient temperature may e.g., be estimated by determining the sensor temperature. Alternatively, the ambient temperature may be estimated by determining a temperature measure from pixels outside the region of interest. Alternatively, external weather information could also be used.

Further, contrast of the thermal video stream may e.g., be influenced by the weather, time of day etc. A change in contrast above a set threshold may be triggering an update of the reference spatial property. Further, if contrast within the region of interest as compared to outside the region of interest starts to deviate an update of the reference spatial property may be triggered. According to one example, the region of interest is set during bad weather, e.g., raining or snowing. Upon the weather becomes better, the difference between contrast within the region of interest as compared to outside the region of interest will start to differ more. In this case it is time to update the reference spatial property. A condition for performing the update may be that the difference between contrast within the region of interest as compared to outside the region of interest increases with 10% or more. Another condition that can be set is that the absolute difference between contrast within the region of interest as compared to outside the region of interest shall be above a threshold, e.g., 50%. Moreover, upon initially setting up the region of interest, in case an absolute difference between contrast within a requested region of interest as compared to outside the region of interest is below a threshold (e.g., below a 25% difference in absolute numbers), a warning will be issued informing that no initial region of interest can be set.

Moreover, if contrast within the region of interest and outside the region of interest starts to be more equal, i.e., the difference in these contrasts goes below a threshold (e.g., below a 25% difference in absolute numbers), no update of the reference spatial property is to be made.

Also, as the thermal camera is calibrated, a total scene temperature dynamic can be estimated. If this temperature dynamic changes above a set threshold number of degrees, this may be a trigger for updating the reference spatial property.

Figure 2:
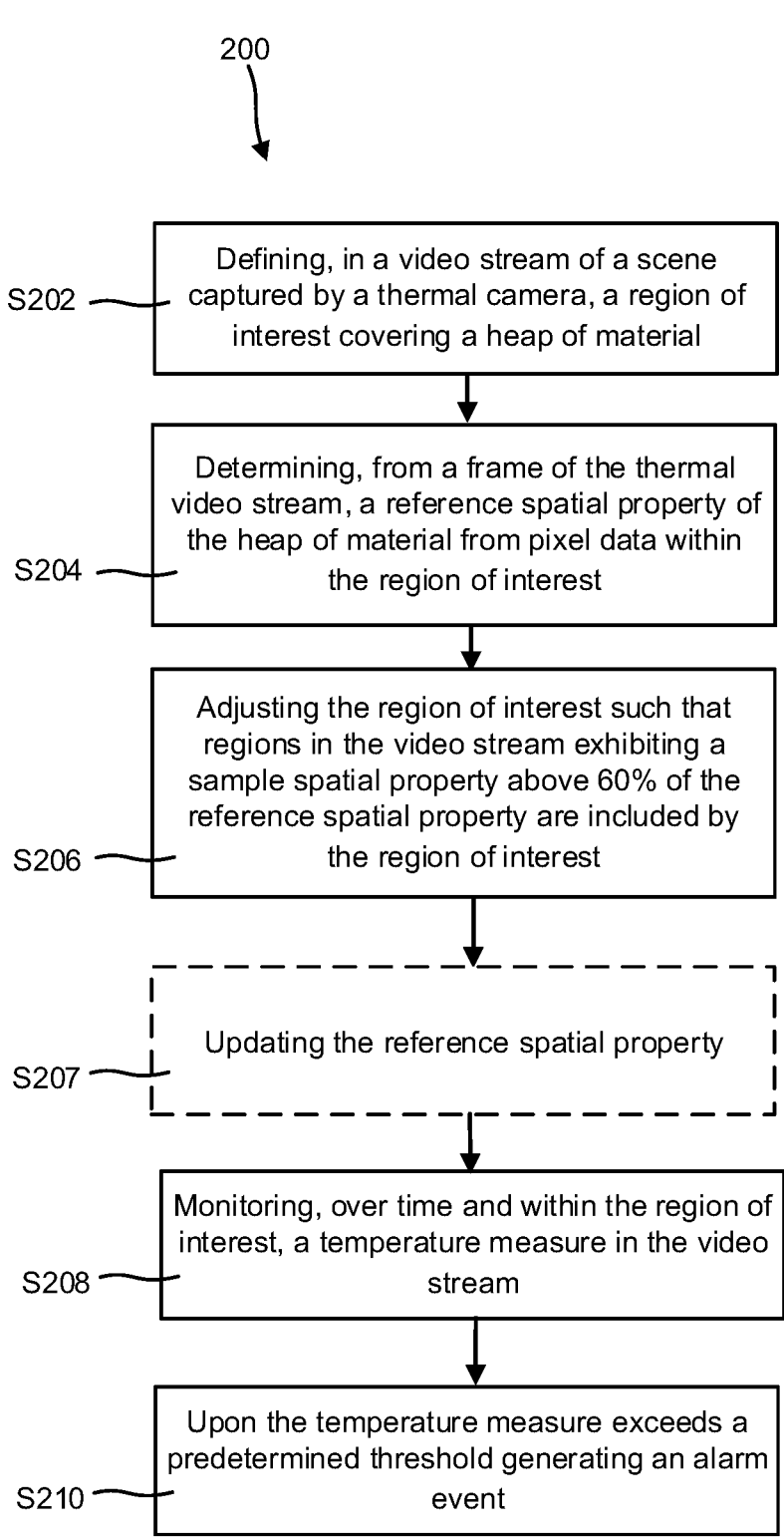
FIG. 2 is a block diagram of a method for monitoring a heap of material.

In connection with FIG. 2 a method 200 for monitoring a heap of material will be discussed. Some of all the steps of the method 200 may be performed by the device 100 described above. However, it is equally realized that some or all of the steps of the method 200 may be performed by one or more other devices having similar functionality. The method 200 comprises the following steps. The steps may be performed in any suitable order.

Figure 3A:
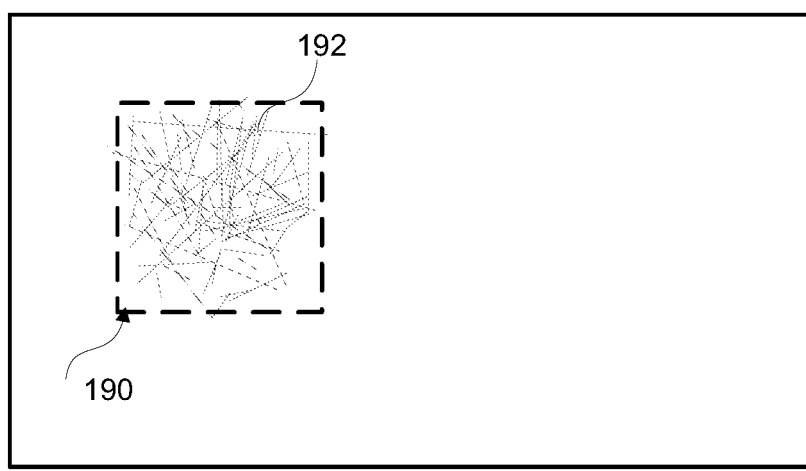
FIGS. 3A, 3B, 3C illustrate a heap of material as depicted by a thermal video camera at different time instances.

Defining S202, in a thermal video stream of a scene captured by a thermal camera, a region of interest covering the heap of material. This step is further illustrated in FIG. 3A in which a frame of the thermal video stream of the scene comprising the heap of material is illustrated. The region of interest 192 covering the heap 190 of material as defined by step S202 is illustrated in this figure. The step of defining S202 a region of interest covering the heap of material is discussed in more detail above in connection with the region of interest function 132. In order to avoid undue repetition reference is made to this discussion.

Determining S204, from one or more video frames of the thermal video stream, a reference spatial property of the heap of material from pixel data within the region of interest. The step of determining S204 a reference spatial property is discussed in more detail above in connection with the reference spatial property setting function 134. In order to avoid undue repetition reference is made to this discussion.

Figure 3B:
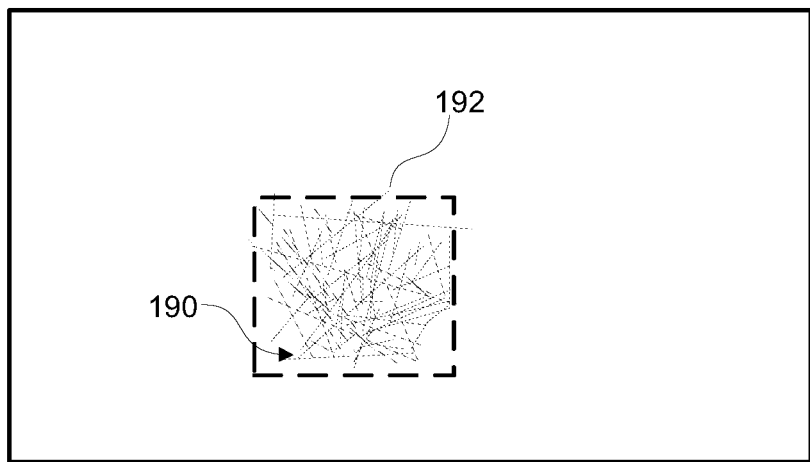
Figure 3C:
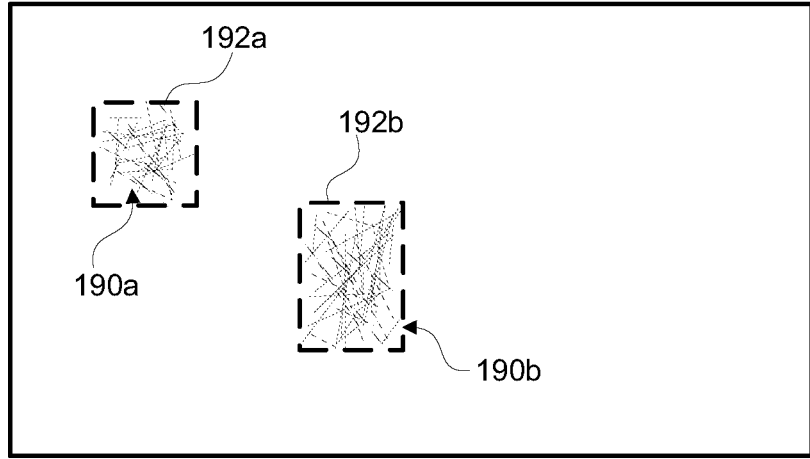

Adjusting S206 the region of interest such that regions in the video stream exhibiting a sample spatial property above a spatial property threshold are included by the region of interest. This step may alternatively, or in combination, be expressed as adjusting the region of interest such that regions in the video stream exhibiting a sample spatial property below the spatial property threshold are excluded by the adjusted region of interest. The step of adjusting S206 the region of interest is discussed in more detail above in connection with the region of interest adjusting function 136. The spatial property threshold may be 60% of the reference spatial property. In order to avoid undue repetition reference is made to this discussion. From the above discussion in connection with the region of interest adjusting function 136 it is realized that the step of adjusting S206 is performed on one or more frames of the thermal video stream being subsequent to the frame form which the reference spatial property is determined. Two different examples of such subsequent frames are illustrated in FIGS. 3B and 3C. In FIG. 3B the heap 190 of material has moved.

Hence, the region of interest 192 has been adjusted in position to move with the heap of material. Moreover, in FIG. 3B the heap 190 of material has been reduced in size. Hence, the region of interest 192 has been adjusted in size to reflect this. In FIG. 3C the heap 190 of material has split in two heaps 190*a*, 190*b*. Hence, the region of interest has also been split in two regions of interest 192*a*, 192*b*. In the above discussed examples, the respective region of interest is illustrated as a rectangular region of interest, it is however realized that the region of interest may take any shape reflecting the shape of the heap of material.

Monitoring S208, over time and within the region of interest, a temperature measure in the video stream. The temperature measure may be one or more of: an absolute value of temperature and a rate of change for the absolute value of the temperature.

Upon the temperature measure exceeds a predetermined threshold generating S210 an alarm event.

The method may further comprise updating S207 the reference spatial property. The updating of the reference spatial property may be triggered by one or more of: an ambient temperature of the thermal camera, a contrast of the video stream; weather data associated with the scene; season; time of day.

The person skilled in the art realizes that the present disclosure by no means is limited to the preferred embodiments described above. On the contrary, many modifications and variations are possible within the scope of the appended claims.

For example, the method may be implemented upon a plurality of different specific heaps of material are present. Each specific heap of material is typically a heap of a different material than the other heaps, e.g., a heap of metal material a heap of paper material, a heap of plastic material, etc. If so, the method may comprise defining, in the video stream, a plurality of region of interests, wherein each region of interest is covering a specific heap of material. Determining, from a video frame of the video stream, a specific reference spatial property for each specific heap of material from pixel data within each respective specific region of interest covering the specific heap of material. Adjusting each specific region of interest such that regions in the video stream exhibiting a sample spatial property within 90%-110% of the respective specific reference spatial property are included by the specific region of interest. Setting a specific predetermined threshold for the temperature measure for each specific region of interest. Monitoring, over time and within each specific region of interest, a specific temperature measure in the video stream. Upon the specific temperature measure exceeds the specific predetermined threshold, generating an alarm event.

Additionally, variations to the disclosed embodiments can be understood and effected by the skilled person in practicing the claimed disclosure, from a study of the drawings, the disclosure, and the appended claims.

The invention claimed is:

1. A method for use in a device having processing capabilities for monitoring a heap of material, the method comprising:

defining, in a video stream of a scene captured by a thermal camera, a region of interest covering the heap of material;

determining, from a video frame of the video stream, a reference spatial property of the heap of material from pixel data within the region of interest, wherein the spatial property is a measure of a spatial frequency of thermal image data;

setting a spatial property threshold in relation to the reference spatial property;

adjusting the region of interest such that regions in the video stream exhibiting a sample spatial property above the spatial property threshold are included by the region of interest;

monitoring, over time and within the region of interest, a temperature measure in the video stream; and upon the temperature measure exceeding a predetermined threshold, generating an alarm event.

2. The method according to claim 1, further comprising adjusting the region of interest such that regions in the video stream exhibiting a sample spatial property below the spatial property threshold are excluded by the adjusted region of interest.

3. The method according to claim 1, wherein the temperature measure is one or more of: an absolute value of temperature and a rate of change for the absolute value of the temperature.

4. The method according to claim 1, further comprising updating the reference spatial property, wherein the updating of the reference spatial property is triggered by one or more of: an ambient temperature of the thermal camera, a contrast of the video stream; weather data associated with the scene; season; or time of day.

5. The method according to claim 1, wherein the reference spatial property and the sample spatial property are one or more of: an image entropy or a density of edges.

6. The method according to claim 1, wherein the reference spatial property and the sample spatial property are calculated for groups of pixels comprising 4×4 to 8×8 pixels.

7. The method according to claim 1, further comprising:

defining, in the video stream, a plurality of region of interests, wherein each region of interest is covering a specific heap of material;

determining, from a video frame of the video stream, a specific reference spatial property for each specific heap of material from pixel data within each respective specific region of interest covering the specific heap of material;

adjusting each specific region of interest such that regions in the video stream exhibiting a sample spatial property between 90%-110% of the respective specific reference spatial property are included by the specific region of interest;

setting a specific predetermined threshold for the temperature measure for each specific region of interest;

monitoring, over time and within each specific region of interest, a specific temperature measure in the video stream;

upon the specific temperature measure exceeding the specific predetermined threshold, generating an alarm event.

8. A non-transitory computer-readable storage medium having stored thereon instructions for implementing a method, when executed on a device having processing capabilities, the method for monitoring a heap of material, the method comprising:

defining, in a video stream of a scene captured by a thermal camera, a region of interest covering the heap of material;

determining, from a video frame of the video stream, a reference spatial property of the heap of material from pixel data within the region of interest, wherein the spatial property is a measure of a spatial frequency of thermal image data;

setting a spatial property threshold in relation to the reference spatial property;

adjusting the region of interest such that regions in the video stream exhibiting a sample spatial property above the spatial property threshold are included by the region of interest;

monitoring, over time and within the region of interest, a temperature measure in the video stream; and upon the temperature measure exceeding a predetermined threshold, generating an alarm event.

9. A device for monitoring a heap of material, the device comprising:

circuitry configured to execute:

a region of interest function configured to, in a thermal video stream of a scene captured by a thermal video camera, define a region of interest covering the heap of material;

a reference spatial property setting function configured to:

from pixels within the region of interest of a video frame of the thermal video stream, determine a spatial property of the heap of material, wherein the spatial property is a measure of a spatial frequency of thermal image data; and set the determined spatial property as a reference spatial property; and set a spatial property threshold in relation to the reference spatial property;

a region of interest adjusting function configured to:

determine a respective sample spatial property for regions in the thermal video stream, and adjust the region of interest such that regions in the thermal video stream exhibiting a sample spatial property above the spatial property threshold are included by the region of interest; and a temperature monitoring function configured to:

over time and within the region of interest, monitor a temperature measure in the video stream, and upon the temperature measure exceeding a predetermined threshold, generate an alarm event.

10. The device according to claim 9, wherein the temperature measure is one or more of: an absolute value of temperature or a rate of change for the absolute value of the temperature.

11. The device according to claim 9, wherein the reference spatial property setting function is further configured to, triggered by one or more of: an ambient temperature of the thermal camera, a contrast of the video stream; weather data associated with the scene; season; or time of day, update the reference spatial property by, from pixels within a current region of interest of a video frame of the video stream, determine a spatial property of the heap of material, and set the determined spatial property as an updated reference spatial property.

12. The device according to claim 9, wherein the reference spatial property setting function and the region of interest adjusting function are configured to determine the reference spatial property and the sample spatial property, respectively, as one or more of: an image entropy and a density of edges.

13. The device according to claim 9, wherein the reference spatial property setting function and the region of interest adjusting function are configured to calculate the reference spatial property and the sample spatial property, respectively, for groups of pixels comprising 4×4 to 8×8 pixels.

14. The device according to claim 9, wherein the region of interest function is configured to, in the video stream, define a plurality of region of interests, wherein each region of interest covers a specific heap of material;

wherein the reference spatial property setting function is configured to, from pixels within each respective specific region of interest of a video frame of the thermal video stream, determine a specific reference spatial property for each specific heap of material;

wherein the region of interest adjusting function is configured to adjust each specific region of interest such that regions in the video stream exhibiting a sample spatial property between 90%-110% of the respective specific reference spatial property are included by the specific region of interest, and to set a specific predetermined threshold for the temperature measure for each specific region of interest;

wherein the temperature monitoring function is configured to:

over time and within each specific region of interest, monitor a specific temperature measure in the video stream, and upon the specific temperature measure exceeding the specific predetermined threshold for the specific region of interest, generate an alarm event.

15. The device according to claim 9, further comprising an image sensor configured to capture thermal video data of the thermal video stream of the scene.

* * * * *